United States Patent [19]

Metzger

[11] 4,044,388

[45] Aug. 23, 1977

[54] INTERACTIVE SERVO CONTROL SYSTEM FOR USE WITH A ROTATING-HEAD MAGNETIC TAPE PLAYER

[75] Inventor: Lenard M. Metzger, Rochester, N.Y.

[73] Assignee: Eastman Kodak Company, Rochester, N.Y.

[21] Appl. No.: 729,621

[22] Filed: Oct. 5, 1976

[51] Int. Cl.² .................. H04N 5/795; G11B 21/04
[52] U.S. Cl. ..................................... 360/70; 360/36; 360/73; 360/77; 360/84
[58] Field of Search .............. 360/70, 77, 73, 75–76, 360/84, 36

[56] References Cited

U.S. PATENT DOCUMENTS

| | | | |
|---|---|---|---|
| 3,375,331 | 3/1968 | Masatoshi et al. | 360/84 |
| 3,549,797 | 12/1970 | Dann | 360/70 |
| 3,838,453 | 9/1974 | Buslik | 360/70 |
| 3,959,815 | 5/1976 | Rotter | 360/70 |

FOREIGN PATENT DOCUMENTS

| | | | |
|---|---|---|---|
| 46-22502 | 6/1971 | Japan | 360/70 |

Primary Examiner—John H. Wolff
Attorney, Agent, or Firm—Robert F. Cody

[57] ABSTRACT

A servo control system provides interactive correction for both tracking and time base errors in a signal reproduced by a rotating playback head from magnetic tape. A tracking control head overlapping adjacent slant tracks provides a signal to a capstan servo for correcting positional errors. Time base errors are corrected by controlling a head servo with respect to variations in the incoming signal time base sensed by the playback head. By mounting both heads on the same head wheel, the head servo control provided by the playback signal has an interactive effect on the tracking sensor: with the playback head wheel moving at the correct speed to eliminate time base error, the tracking sensor will "pull" the tape into precise tracking alignment by adjustment of the capstan servo. With the tape and head replicating their exact counterpart speeds obtained during record, skew at the point of head switching is automatically eliminated.

6 Claims, 3 Drawing Figures

INTERACTIVE SERVO CONTROL SYSTEM FOR USE WITH A ROTATING-HEAD MAGNETIC TAPE PLAYER

FIELD OF THE INVENTION

The invention relates in general to servomechanisms for use with magnetic tape recorders; more specifically, the invention provides servo apparatus for use with a helical scan magnetic tape player to compensate for time base, tracking and skew errors.

DESCRIPTION RELATIVE TO THE PRIOR ART

Copending and commonly assigned patent application Ser. No. 729,620 filed Oct. 5, 1976 discloses tracking control apparatus for use with a rotating-head magnetic tape player. By mounting a tracking control head on the playback head wheel so that it overlaps adjacent recorded tracks and senses periodic information included therein, the apparatus provides a control signal for driving a tape capstan servo without need for the additional control track usually required by such apparatus. The periodic information may be, for example, the horizontal sync of a video signal in the adjacent tracks; the control signal is then derived from a comparison of the respective amplitudes of such horizontal component from each track. Since the overlapping position of the tracking head is fixedly related to the tracking position of the playback head, the control signal is indicative of the tracking alignment of the playback head itself. By mounting the tracking head on the playback head wheel, and by further using the record head during playback for such purpose, a dynamic real-time tracking apparatus is provided which additionally dispenses with a separate tracking control head.

Although this apparatus diminishes tracking errors, it does not eliminate all of the instabilities in the tape playback operation. Perfect playback occurs, of course, if the tape is subjected to exactly the same conditions on playback as it was on record. Mere assurance of perfect tracking does not resolve all the problems of playback, however. Minor instabilities, for example, in the head wheel may cause errors in the reproduction of the original time base of the recorded signal. Insofar as these instabilities are found at higher frequencies, flutter is the result. Furthermore, tape stretch, tension changes in the tape and skewed tape movement will cause additional instability during playback, often generally referred to as skew error. The above-mentioned copending application, while resolving the tracking question, does not eliminate time base or skew problems. True, the tape is forced into alignment with the head; but the head stability itself is unaffected as the capstan endeavors to achieve this alignment, just as the capstan servo will disregard tension as long as the tape tracks properly. In other words, the capstan servo may accomplish its function of tape positioning with precision while the tape still remains skewed and the head wheel still contributes flutter and other time base errors.

The time base error in the system includes any tape or head irregularity which alters the phase and frequency relationship between successive signal peaks on the tape. Therefore, just as tracking is primarily a positional consideration, time-base error is primarily a temporal consideration. As pointed out in the copending application, most video tape players achieve a degree of tracking precision by merely adjusting the head servo; some few, primarily intended for use in editing, control tracking through the capstan servo. Those tape players using the head drum servo to maintain tracking possess a fundamental flaw with regard to simultaneous time base correction. Time base error is fundamentally contributed by an erratically operating playback head wheel, i.e., a head wheel which is not replicating the exact speed of the record head wheel. However, in such a system, the head servo is responding to variations in stretch and linear tape speed between the head drum and the control track head. In other words, tracking corrections made by the head drum servo actually introduce time base errors into the player output.

Skew implies that the tape is moving in some manner, as it passes the video head, other than that assumed during recording. Such skew may be a fixed error if caused either by misalignment of head to tape or by misguiding that causes a fixed difference in tension distribution across the tape. On the other hand, dynamic skew is caused by uneven tension distribution across the tape such as caused by tape scrape and vibration. Particularly in a playback machine capable of maintaining the path of the playback head adjacent a recorded track on the tape, skew manifests itself as a discontinuity when switching between heads. In such a situation, the tracking and time base correction mechanisms may be sufficiently responsive to hold the head in alignment, even with a skewing tape. But when the end of a track is reached, the compensating mechanisms cannot force the next head to perfectly anticipate the beginning location of the next track. Consequently a timing variation occurs, showing up — in the case of video — as a hook at the top of the picture. Although having a timing characteristic, skew therefore results when adjacent magnetic tracks are pulled out of alignment with the rotating heads, particularly at the moment of switching between tracks. As such, skew error, besides having a timing characteristic, also has an inseparable dimensional or lineal characteristic related to the position of the tracks vis a vis the heads.

SUMMARY OF THE INVENTION

With tracking control provided by the capstan servo, the head servo is freed during playback for time base correction without the defeating influence of head speed variations for purposes of positional replication. The prior art, it is remembered, generally slaves the head speed to a control track - basically therefore to achieve a positional imitation of recording conditions. This has the untimely effect of designing flutter and time base error into the playback machine.

Furthermore, the present approach to time base and tracking correction has the potential of automatically eliminating skew problems. Skew, as described herein, is the hybrid effect of both positional and temporal errors. By providing a thorough correction for each of these errors, skew is cleared away as well during the sweep of the rotating heads from one track to the next. Formerly, however, this "thorough" correction was extremely elusive since the head wheel — the locus of time base error — was inseparably involved in tracking correction as well. This tended to generate a hunting or self-perpetuating oscillating effect which inhibits total correction. What in the end must be done is to isolate each correction so that time base relates to the original head speed and tracking relates to the original linear tape speed. In the interim, however, this is done by first bringing the head up to speed and then by forcing the capstan to deliver tape to the head at the requisite rate to maintain correct head speed. The requisite rate, then, becomes a replication of the recording tape speed.

Consequently, the invention provides interactive servo correction for both positional and temporal errors in the playback system. By utilizing the apparatus in the copending application, a positional — or tracking — correction is provided. What the present invention does, in the case of video, is to additionally provide a temporal — or time base — correction by processing the horizontal sync signal from the playback video signal for driving the head servo at some nominal speed and for controlling that nominal speed in accordance with low frequency time base variations. Higher frequency time base variations and transient skew effects are shunted to the playback electronics for treatment by an electronic time base compensator.

In a key aspect of the invention, both servo signals originate from sensors that are mounted on the same head wheel. This means that the head servo control provided by the playback signal has a direct, mechanical, interactive effect on the tracking sensor. The head servo will be precisely slaved to a control signal reflecting the varying time base of the incoming video; then, with the playback head wheel moving at the correct speed to achieve absolute time base correction in the playback signal, the tracking sensor will "pull" the tape into precise tracking alignment by means of adjustment to the capstan servo. With the tape and head replicating their exact counterpart speeds during record, and with the resulting absolute time base correction, skew is automatically eliminated through the cooperation of the interactive servos and the electronic time base compensator.

BRIEF DESCRIPTION OF THE DRAWINGS

The invention will be described with reference to the figures, wherein.

DESCRIPTION OF THE PREFERRED EMBODIMENTS

Because rotary-head tape recorders are well known, particularly in connection with video recording, the present description will be directed in particular to elements forming part of, or cooperating more directly with, the present invention. Recorder elements not specifically shown or described herein may be selected from those known in the art. Although the following description will be directed in particular to embodiments for use with a helical recorder, it is clear that the basic aspects of the invention are applicable as well to any rotary head recorder.

Figure 1:
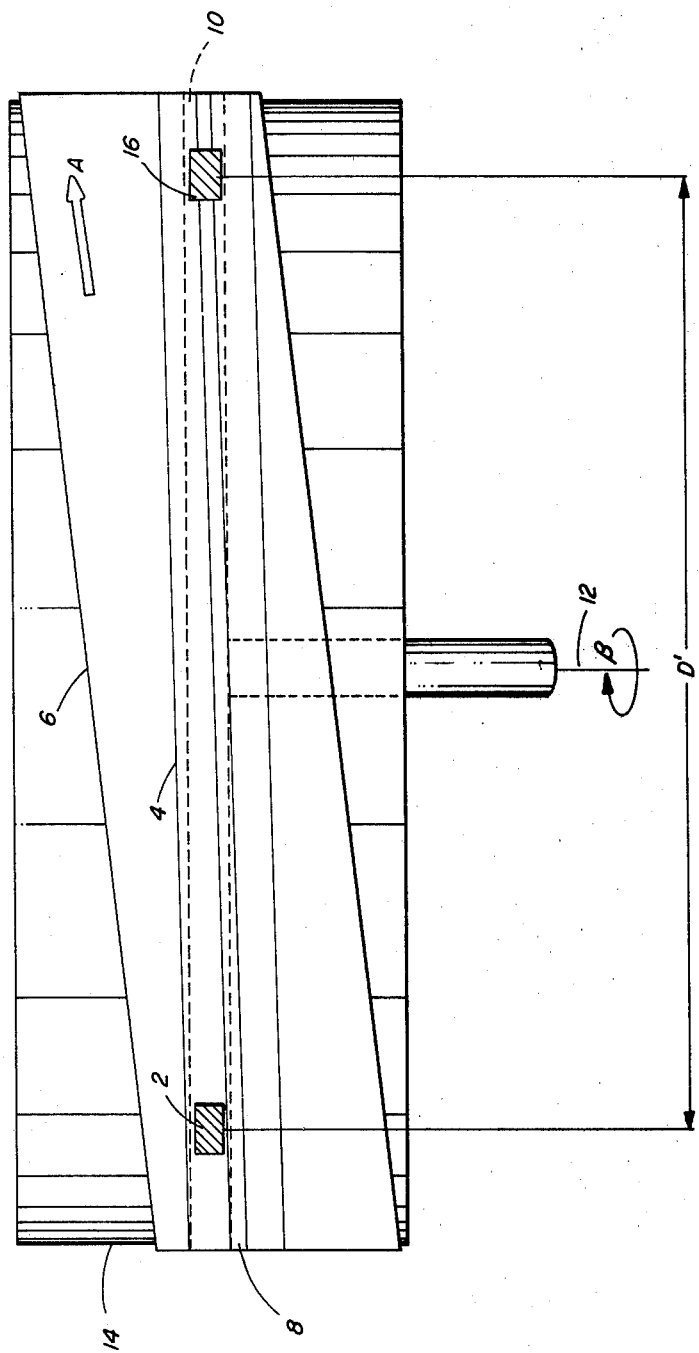
FIG. 1 is a view illustrating a preferred arrangement of time base and tracking sensors mounted on a head wheel for cooperation with slant tracks on a magnetic tape.

Referring now to FIG. 1, there are shown the relevant components, for purposes of the present invention, of a presently preferred embodiment of a tracking control system provided in accordance with the previously mentioned copending application Ser. No. 729,620. The disclosure included with that application is hereby incorporated by reference into the present disclosure and is understood to be a foundation upon which the present disclosure will expand. Relevant portions of copending application Ser. No. 729,620 will now be highlighted to ensure a proper understanding of the present invention.

With reference again to FIG. 1, tracking alignment as used herein means the alignment of a playback head 2 to a slant track 4 prerecorded across the width of a tape 6. The slant track 4 may be provided by a conventional helical recording system in which the tape 6 is obliquely guided past a rotating head wheel on which a record head is mounted for rotation therewith. The slanted tracks thus recorded on the tape 6 are parallel to each other and separated by a guard band 8 which is ordinarily much narrower than the tracks themselves. The figures exaggerate the width of the track and guard band for purposes of illustration only; a typical format would include tracks of 6 mil width separated by a guard band of 2.7 mils. Of course, other formats are possible and usable with the invention. The playback head is adapted to follow a path overlying each recorded track 4 in sequence. For that purpose, the playback head 2 is customarily mounted on a head wheel 10 about an axis 12 for rotation in a direction described by an arrow B. The tape 6 is guided around a head drum 14 in a direction shown by an arrow A and past a slot therein exposing the rotating playback head 2.

The copending application, with portions illustrated in FIG. 1, shows a tracking head 16 fixedly associated with the playback head 2 by being mounted together therewith on the same head wheel 10. As with the playback head 2, the circumferential slot formed about the mid-section of the drum exposes the head 16 for contact with the tape 6. The tape 6 is driven by a capstan (not shown in FIG. 1) in a direction described by the arrow A while the head wheel is rotated in a direction described by the arrow B. The resultant of these movements describes the path of the head 2 relative to the tape 6. FIG. 1 represents an isolated moment in time; it is seen from the illustration how the track 4 shifts from the center of the head wheel 10 as the tape 6 is pulled further from the playback head 2. If the tracking head 16 is mounted on the head wheel 10 a distance D' from the playback head 2, it will overlap the track 4 and an adjacent track 4'. D' is not critical insofar as overlap is maintained; as explained hereinafter, it is only critical that the amount of overlap be known for the tracking circuits to function properly.

Putting the two heads upon the same head wheel 10 is particularly advantageous in that the tracking function is occurring substantially simultaneous with the playback function. This sort of dynamic, real-time tracking eliminates the influence of tape and machine irregularities that usually creep into the system between the point of playback and the point of tracking control, e.g., the points at which the video head and the control track head are located. With these influences gone, the capstan servo responds to the actual state of tracking substantially at the point of playback. It is true that the distance D' separates the playback head 2 from the tracking head 16 but the high speed of the heads with respect to the tape speed insure that the lapse is momentary compared to the normal time of tape transport from the head drum to a control track head.

Still further advantages are gained if the helical machine is one which is adapted to record as well as playback. In such a case, the record heads are unused during playback although they intermittently contact the tape in synchronism with the playback heads. FIG. 1 is also sufficient to illustrate a typical placement of a "record" head 16 with respect to the playback head 2 on the head wheel 10. What is different now is that the "record" head 16 performs the function of the tracking head during playback. Suitable switching apparatus (not shown) is provided for selectively connecting the head 16 to either the recording output circuits or the tracking signal input circuits.

Figure 2:
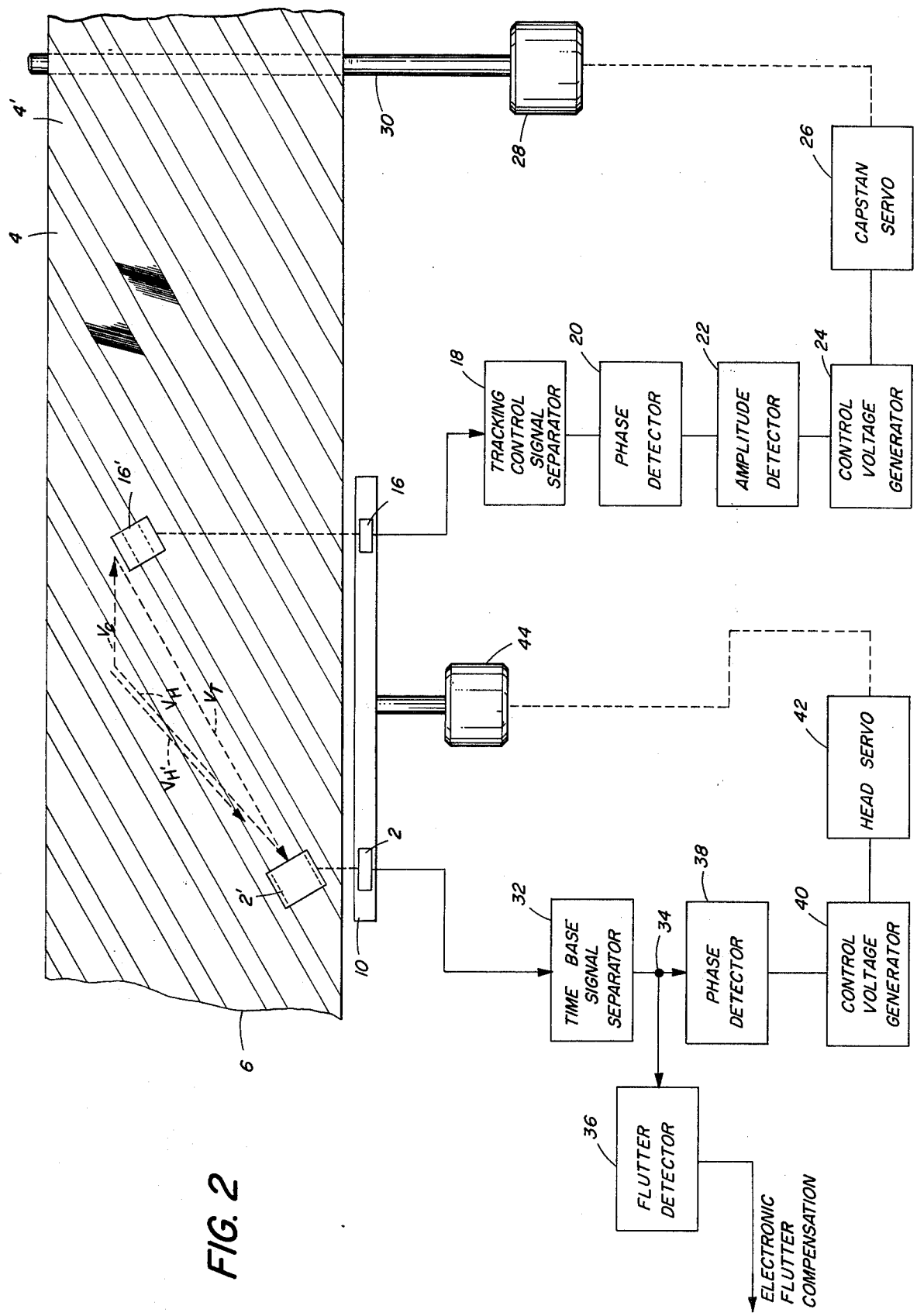
FIG. 2 is a diagrammatic illustration of an interactive servo control system in accordance with a presently preferred embodiment of the invention.

Referring now to FIG. 2, there are shown the basic components of a presently preferred embodiment of an interactive servo control system in accordance with the invention. As with FIG. 1, the playback head 2 and the tracking head 16 are shown diagrammatically as being mounted for rotation on the head wheel 10. The projection of their relative positions at a given moment on the tape 6 is depicted by a playback head 2' overlying the magnetic track 4 and a tracking head 16' overlapping adjacent magnetic tracks 4 and 4'.

It is to be noted that, when the playback head 2 is correctly tracking the prerecorded track 4, the tracking head 16 will overlap respective adjacent tracks 4 and 4' to a predetermined degree. This means that the tracking head 16 is simultaneously sensing the signals magnetically present in both adjacent tracks 4 and 4'. If a control signal is recorded along the length of adjacent tracks 4 and 4', the tracking head will sense its relative presence in each track and produce a composite signal that includes the control signal from each track. The control signal may be of any waveform having a parameter which is sensed by the tracking head 16 in accordance with the degree of overlap. Thus the tracking head 16 serves as a position sensing means. The control information may be provided by a pattern of recurring pulses, for example, that are provided especially for use with the present apparatus.

Figure 3:
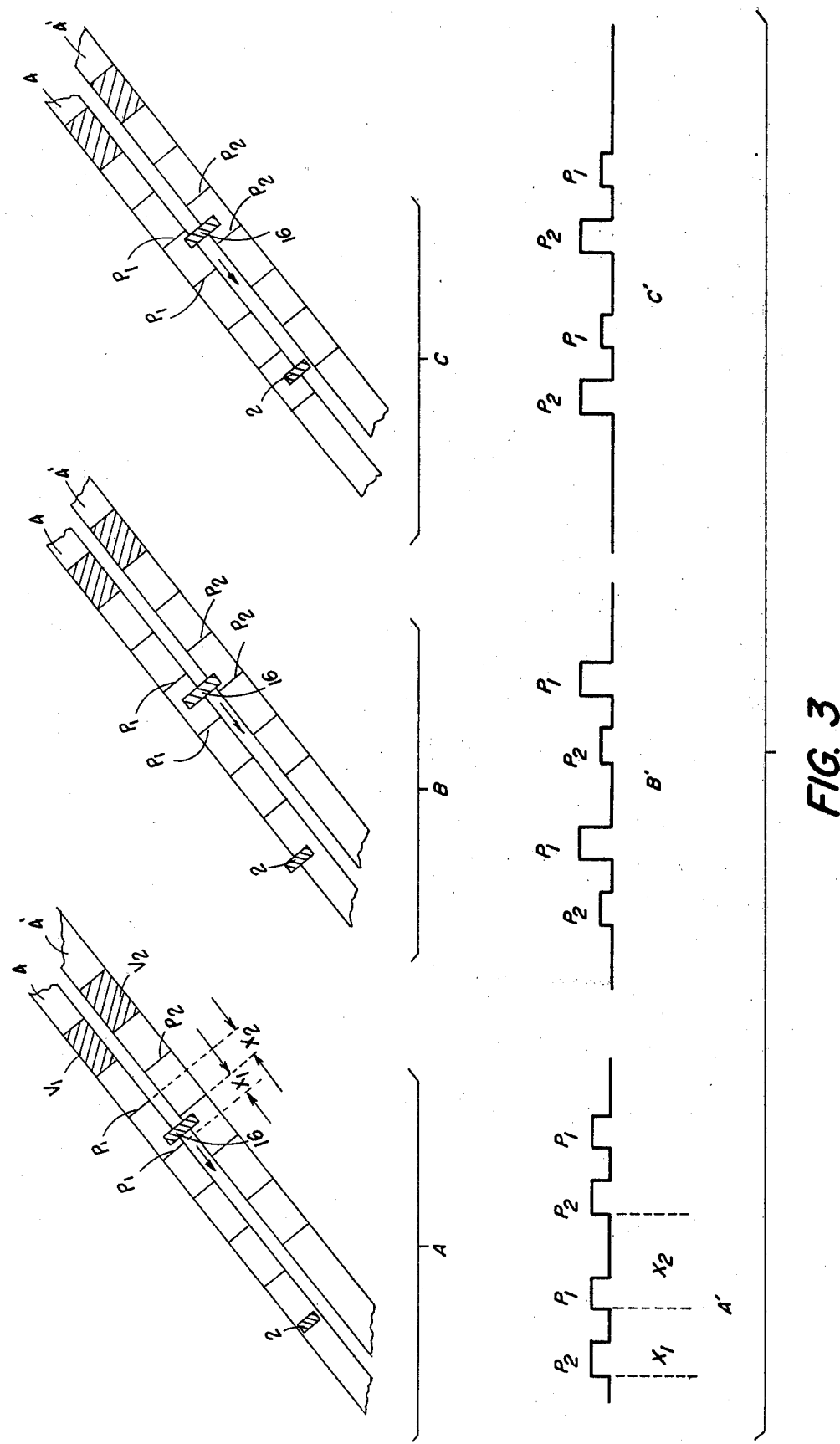
FIG. 3 is a diagrammatic illustration of three tracking conditions and the corresponding horizontal sync pattern derived therefrom.

More likely, and in a presently preferred embodiment intended for tracking a video signal, the horizontal synchronization pulses in adjacent tracks 4 and 4' are employed for rendering an indication of tracking. How this works is illustrated in FIG. 3. It is assumed for purposes of illustration that the tracking head 16 equally overlaps adjacent tracks 4 and 4' when the video playback head 2 exactly overlies the track 4. This situation is diagrammatically illustrated in FIG. 3A and the corresponding reproduced pulse waveform, or train of signals, is shown in FIG. 3A'. The pair of pulses $P_1$ and $P_2$ correspond, respectively, to horizontal sync signals located at predetermined positions along adjacent tracks 4 and 4'. Because of the equal overlap, the pulses $P_1$ and $P_2$ have identical amplitudes. However, it is only necessary that some overlap occurs as long as the amount can be determined and used as a reference. The larger cross-hatched blocks $V_1$ and $V_2$ correspond to the vertical sync pulses in each adjacent track 4 and 4'.

Tracking requires the distinguishing of one pulse from another so that the capstan servo may be adjusted to make a proper correction. For that purpose, the horizontal sync pulses in adjacent tracks 4 and 4' are so arranged that the reproduced pulses $P_1$ following $P_2$ are separated by a distance $X_1$ whereas the reproduced pulses $P_2$ following $P_1$ are separated by a distance $X_2$. These separate distances enable the determination of which pulse in which; otherwise there would be no basis for determining in which direction there should be a correction. Admittedly, in the format prescribed in FIG. 3, there are certain limitations on how one track may be arranged with respect to its adjacent track for the system to work. Namely, pulses $P_1$ and $P_2$ can neither be lined up equidistant nor coincident, else the identity of the pulses would be impossible to discern. This is not presumed, however, to limit the forms other embodiments may take.

FIG. 3 goes on to illustrate, in 3B and 3C, the two ways in which mistracking will manifest itself with respect to the tracking head 16 and how the corresponding output waveforms will look. FIG. 3B describes a situation in which the playback head 2 slips to one side of the track 4 so that the tracking head 16 correspondingly slips into more of track 4 than track 4'. This produces a pulse waveform, shown by FIG. 3B', in which the amplitude of the pulse $P_1$ — originating from track 4 — is greater than the amplitude of the pulse $P_2$. The converse situation is illustrated in FIG. 3C in which the playback head 2 slips to the other side of the track 4 so that now the tracking head 10 slips into more of track 4' than track 4. This produces the converse waveform, shown by FIG. 3C', in which the amplitude of the pulse $P_2$ — originating from track 4' — is greater than the amplitude of the pulse $p_1$.

Returning now to FIG. 2, the information sensed by the tracking head 16 — including, in this embodiment, the pulses $P_1$ and $P_2$—is delivered to a tracking control signal separator 18 which processes the composite signal from adjacent tracks 4 and 4' and provides a waveform output comprising substantially the tracking control signal by itself. Without limiting the forms which this signal may take, the presently preferred embodiment encompasses the pulse waveform shown variously by FIG. 3A', B', or C. Next the tracking signal is processed by a phase detector 20 for determining the identity of each recurring signal, i.e., which track 4 or 4' each signal component is originating from. Once the signal components are distinguished, an amplitude detector 22 determines both the direction and degree of mistracking. The amplitude detector 22 drives a control voltage generator 24 that in turn delivers a control voltage to a capstan servo 26 for varying the nominal speed of a capstan drive 28. A capstan 30 is mounted for rotation on the drive 28.

With the positional or tracking correction provided by the foregoing apparatus, the remainder of FIG. 2 is devoted to the improved time base or temporal correction that, together with the tracking servo, provides the interactive servo system that is the subject of the present invention. For purposes of illustration, and for use with the presently preferred embodiments, a video signal is assumed to be recorded on the adjacent tracks 4 and 4'. A video signal with horizontal synchronization components is reproduced by the playback head 2'. A time base signal separator 32 separates the synchronization pulses from the composite signal and provides the pulses to a junction point 34. From this junction, the higher frequency time base errors are detected by a flutter detector 36 for use with conventional electronic flutter compensation circuitry. Such high frequency flutter compensation may be provided, for example, by an electronic delay line driven by a suitable clock derived from the fluttering video. Furthermore, and as hereinafter described, the electronic flutter compensation circuit also corrects for certain skew transients beyond the responsiveness of the servos.

The junction 34 is also connected to a phase detector 38 that responds to time base errors of lower frequency. The phase detector provides an output proportional to the phase difference between the stripped sync signals and a standard reference oscillator frequency $\phi'$, for example, one at the horizontal line rate. Such phase difference is indicative of the time base error inherent in the reproduced signal. A control voltage generator 40 responds to the phase difference and provides a control voltage to a head servo 42 for driving a head wheel drive 44. The range of useful time base frequencies handled by the phase detector 38, and the point at which the system must revert to electronic flutter compensation, depends on the inertia and responsiveness of the head drum drive and servo. If the head wheel drive 44 has very low inertia and the head servo 42 is made sufficiently responsive, flutter compensation can be obtained through the lower frequency range.

The important aspect to note is that both servo control signals — the one controlling the capstan servo 26 and the other controlling the head servo 42 — originate from sensors that are mounted on the same head wheel 10. When the head servo 42 locks onto the precise horizontal line rate used during record, the resulting adjustment in head speed has two worthy aspects. First, the correcting signal to the head wheel servo 42 is predominantly one of time base correction rather than a contaminated mixture of time base and tracking correction. Second, the head servo control provided by the playback signal has a direct, mechanical, interactive effect on the tracking sensor. The head servo will be precisely slaved to the time base of the incoming video; then, with the playback head wheel moving at the correct speed, the tracking sensor will "pull" the tape into precise tracking alignment by means of adjustment to the capstan servo.

The vector diagram in FIG. 2 is useful in describing the interactive effect between the playback head 2 and the tracking head 16. A vector $V_H$ illustrates the head velocity vector. When combined with a tape capstan velocity vector $V_C$ the resultant track velocity vector $V_T$ illustrates the lay of the magnetic track 4 on the tape 6. Presuming that, as illustrated in FIG. 2, the head wheel 10 is rotating too rapidly to replicate recording conditions, a smaller head velocity vector $V_H$, is obtained by slowing the head servo 42 until it locks onto the correct horizontal line rate. The lowered head speed has the effect of making the playback head track to one side of the track 4, as illustrated in FIG. 3B. Because of the mechanical interaction between the playback head 2 and the tracking head 16 the tracking head 16 correspondingly slips over into the track 4 with the result that the horizontal sync pulse $P_1$ from track 4 predominates over the horizontal sync pulse $P_2$ from track 4'. The tracking control signal generator 18 separates the pulse waveform illustrated in FIG. 3B' from the composite signal sensed in adjacent tracks 4 and 4'. The subsequent phase detector 20 (FIG. 2) and amplitude detector 22 determine that the pulse $P_1$ exceeds the pulse $P_2$ by a certain amount. The amplitude detector 22 provides an output for driving the control voltage generator 24 in accordance with the magnitude of the difference between the amplitudes of pulses $P_1$ and $P_2$. The resulting voltage output of the control voltage generator 24 causes the capstan servo 26 to vary the speed of the capstan drive 28 such that the tape 6 slows up enough to permit the playback head 2 to regain a precisely centered position overlying the track 4. This condition will obtain when the pulse waveform illustrated in FIG. 3A' is regained.

A similar situation, but opposite in result, prevails when the head wheel is rotating too slowly to replicate recording conditions. When the time base correction is made, the playback head 2, illustrated in FIG. 2, slips off the track 4 in the opposite direction. Correspondingly, the tracking head 16 slips over into the track 4', as illustrated in FIG. 3C, and the horizontal sync pulse $P_2$ from track 4' predominates over the horizontal sync pulse $P_1$ from track 4. What differs in this case is that the output of the control voltage generator 18 causes the capstan servo 26 to increase the speed of the capstan motor 28 until the playback head 2 regains a position precisely overlying the track 4.

Since the recording head and tape speeds are both being faithfully reproduced, and the playback head is exactly overlying each recorded track, the motion of the playback head continuously replicates the path of the recording head, whether on or off the tape. Consequently, the playback head — usually one of a pair — meets the beginning of each recorded track precisely in line therewith. The gross or long-term skew discontinuities commonly associated with head switching are thereby automatically eliminated as the hybrid byproduct of correcting time base and tracking errors. In addition, with the head servo 42 providing an absolute time base correction, the electronic flutter compensator is disposed to correct transient skew effects that are beyond the capability of the head servo 42 to eliminate. If the electronic flutter compensator does not have to contend with a signal of varying time base, it is more likely to provide a time delay that can return to an average value after head switching. This means that the head servo will correct for long term skew effects during the line while the electronic flutter compensator will correct for transient skew and dihedral errors with a single time delay change at the time of head switching.

While the time base correction achieved in the present illustration utilized the horizontal synchronizing signal in the video information, it is clear other time based signals may be used. For example, a pilot signal may be provided for this purpose in an unused spectrum space in the recorded signal bandwidth. Also the parameter for evaluating time base error need not be frequency; phase information, for example, is similarly useful. Indeed, there is no requirement that the processed information signal be of a video character.

The invention has been described in detail with particular reference to preferred embodiments thereof but it will be understood that variations and modifications can be effected within the spirit and scope of the invention.

What is claimed is:

1. In a servo control system for use with a rotary head magnetic tape player having a rotary playback head that reproduces an information signal from slant tracks on a magnetic tape, the information signal having a signal component thereof with a parameter dependent upon variations in the speed of head rotation, the tape player also having a rotary tracking control head that overlaps adjacent slant tracks for providing a tracking control signal to a capstan servo apparatus whereby the tape speed is so maintained that the playback head overlies a recorded slant track when the tracking control head is in a predetermined overlapping position, the improvement comprising:

means responsive to the signal component in the information signal for generating a time base control signal for regulating the speed of the rotary playback head;

means responsive to said time base control signal for so adjusting the rotation of the playback head that the signal component parameter substantially assumes a predetermined value; and interactive means associating the rotary playback head with the rotary tracking head for changing the overlapping position of the tracking head from its predetermined position relative to said adjacent tracks in response to a change in the rotational speed of the playback head, and for thereby causing a modification of the tracking control signal, whereby the capstan servo so adjusts the tape speed that the playback head regains its predetermined position overlying a recorded slant track.

2. The apparatus of claim 1 in which said information signal comprises a video signal and said signal component thereof comprises a horizontal synchronization component, said parameter thereof further comprising the frequency of said synchronization component.

3. The apparatus of claim 1 wherein said interactive means comprises a head wheel on which the playback and tracking heads are mounted for rotation therewith.

4. In a servo control apparatus for use with a magnetic tape recorder of the type in which a magnetic tape having slant recorded tracks thereon is moved past a rotating playback head for reproduction of an information signal therefrom,
   a. position sensing means overlapping first and second adjacent magnetic tracks for reproducing first and second signals from said first and second magnetic tracks respectively, said first and second signals having amplitudes corresponding to the amount of overlap between said position sensing means and said first and second adjacent tracks respectively;
   b. means cooperatively associating said position sensing means with said playback head for providing that said first and second signals have predetermined respective amplitudes when said playback head overlies a playback track in an aligned tracking position, said cooperatively associating means further adapted for providing that said position sensing means have a plurality of different positions overlapping said first and second adjacent tracks in correspondence with a plurality of different non-aligned tracking positions of said playback head with respect to said playback track, each said overlapping position providing first and second signals having respective amplitudes that uniquely correspond to each said non-aligned tracking position; and
   c. means responsive to changes in the amplitudes of said first and second signals for adjusting the movement of the tape whereby said playback head maintains said aligned tracking position, the improvement comprising:
      1. means for separating a varying time base parameter from the information signal;
      2. means for detecting the departure of said varying time base parameter from a reference time base and for providing a control signal indicative thereof;
      3. means responsive to said control signal for altering the speed of rotation of the playback head and thereby altering both the time base of the information signal reproduced therefrom and the tracking position of the playback head, whereby the time base of the reproduced information signal approximates the time base of said reference; and
      4. means interacting said responsive means and said position sensing means for readjusting the movement of the tape in response to a changed tracking position of the playback head, whereby said playback head maintains said aligned tracking position.

5. The apparatus of claim 4 in which said interacting means comprises a rotary head wheel on which said position sensing means and said playback head are mounted for rotation therewith.

6. In a magnetic video tape player having a capstan servo for controlling the speed of a magnetic tape in accordance with a control signal obtained from the video information,
   a. a plurality of adjacent slanted recording tracks on said tape, separated by a guard band, and having synchronization information recorded thereon in accordance with a reference time base;
   b. a playback head mounted for rotation on a head wheel;
   c. sensing means also mounted for rotation on said head wheel for straddling adjacent slanted tracks whenever said playback head is substantially overlying a slanted playback track and for increasingly straddling one or the other said adjacent track when said playback head slips off said slanted playback track in one or the other direction, said sensing means adapted to reproduce a train of signals including a composite synchronizing component from said synchronizing information in each of said adjacent tracks, said component having a pair of amplitude parameters relatively determined by the degree of overlap between said sensing means and each of said adjacent tracks; and
   d. means responsive to said amplitude parameters of said composite synchronizing component for providing said control signal to said capstan servo.

whereby the speed of the magnetic tape is so controlled that the playback head overlies each slanted recording track, the improvement comprising:
   1. means connected to said playback head for detecting the time base of the reproduced video information and departures thereof from the reference time base;
   2. head servo control means for regulating the speed of said head wheel; and
   3. means responsive to said detecting means for providing a control signal to said head servo control means for regulating the speed of said head wheel, whereby the speed of the head wheel is so controlled that (1) the reproduced video information duplicates the reference time base, and (2) the resulting adjustment in head speed has a cooperative, interactive effect on said sensing means thereby causing the speed of the magnetic tape to be modified such that the playback head continues to overlie the slanted recording track.

* * * * *